June 4, 1940.  M. WATTER  2,203,345
GUN TURRET
Filed April 27, 1938  2 Sheets-Sheet 1

INVENTOR.
MICHAEL WATTER
BY
ATTORNEY.

June 4, 1940.  M. WATTER  2,203,345
GUN TURRET
Filed April 27, 1938   2 Sheets-Sheet 2

INVENTOR.
MICHAEL WATTER
BY
ATTORNEY.

Patented June 4, 1940

2,203,345

UNITED STATES PATENT OFFICE 2,203,345

GUN TURRET

Michael Watter, Baltimore, Md., assignor to The Glenn L. Martin Company, Baltimore, Md.

Application April 27, 1938, Serial No. 204,558

1 Claim. (Cl. 89—37.5)

The present invention relates to gun turrets, and particularly to rotatable gun turrets for use in aircraft.

Turrets of many types have been suggested in the prior art, but a majority of them are unsatisfactory because of their limited firing range, their poor visibility, or the production of a great increase in the aerodynamic resistance of the aircraft by their protrusion therefrom.

The primary object of the present invention is to provide a simple type of turret, particularly adapted to be mounted on the side of an aircraft, which, while avoiding any large increase in aerodynamic resistance, has a wide range of fire and a wide angle of visibility.

A further object of the invention is to provide a gun turret in which the aiming is accomplished by rotation of the gun turret about two mutually perpendicular axes, one or both of which are located within, but close to the plane of, the wall from which the turret protrudes.

Still another object of the invention is to provide a turret of this type in which the gunner is entirely protected for any air blasts.

A further object of the invention is to provide a turret, which is so mounted in the aircraft as to have itself a wide range of angular position, with a surrounding framework of transparent material so that the visibility is greatly increased, this transparent material fairing the turret into the aircraft.

According to the specific construction which is employed, the turret includes a member of transparent material forming considerably more than one-half of a sphere, a part of such turret protruding from the side of the aircraft. In this manner the turret can be rotated through the greater part of a half sphere without increasing the resistance, while permitting good visibility, and while preventing any air blasts upon the gunner.

Still another object of the invention is to provide a turret of this type in which the supporting frame is located principally within the aircraft, thus remaining in a protected position although the gun is permitted to have a wide range of fire.

Further objects and advantages of the invention will appear more fully from the following description, particularly when taken in conjunction with the accompanying drawings, which form a part thereof.

Figure 1:
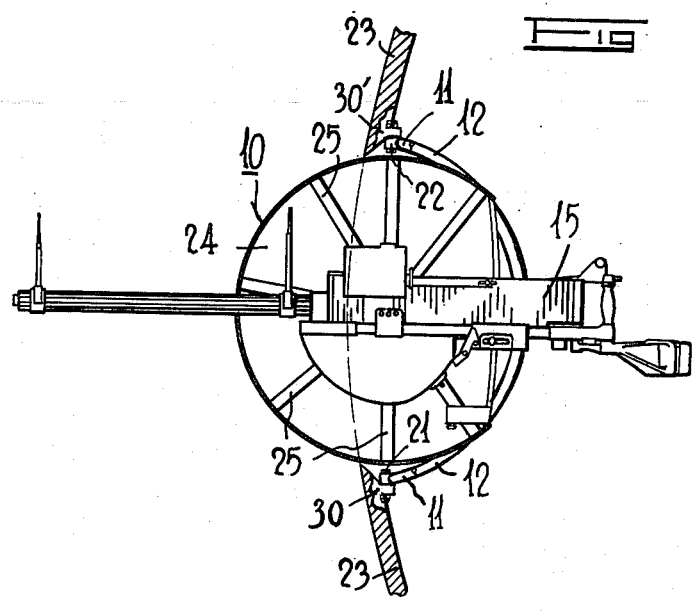
Fig. 1 is a vertical sectional view through a gun turret mounted on the side wall of an airplane and embodying the invention.

As shown in the drawings, the gun turret generally is indicated at 10. Its mounting includes a portion A intended to turn about a vertical axis and a portion B mounted on the member A to turn about a horizontal axis. The portion A comprises two arcuate arms 11 and 12 rigid at their ends with pivoted bearing members 21 and 22, and arranged to include substantially a right angle therebetween, thus forming a vertical slot or sector. Bearing members 21 and 22 are mounted on pins carried by lugs 30 and 30' rigid with the side wall 23 of an aircraft body. In this manner the frame A is mounted to turn about a vertical axis, which axis is located substantially at the plane of the side wall of the aircraft.

Each of the members 11 and 12 has extending therefrom an arm, indicated at 13 and 14 respectively. These arms are substantially perpendicular to the members 11 and 12, and are curved about the axis of the bearings 21 and 22 as a center. The length of these arms is such that with the space between the members 11 and 12 they define substantially a half circle.

To the ends of the arms 13 and 14 is pivoted at 28 and 29 the gun support or cradle B, consisting of two spaced arcuate members 16 and 17 connected by cross members 18, these carrying between them the support 19 for the gun 15. The gun may be secured to said support, or may be removably mounted thereon in any conventional manner. The axis of the pivots 28, 28 is in the same plane as, but perpendicular to, the axis of pivots 21 and 22.

Rigid with the members 16 and 17 is the turret proper, comprising a transparent arrangement forming the greater part of a sphere. This consists of framework members 25, between which are arranged panes 24 of transparent material, such as Celluloid, glass or the like, the gun 15 fitting in an opening in the turret.

By this mounting, the gunner, who of course stands at the righthand side of Fig. 1, is able to manipulate the gun with clear visibility and through a wide angle. The gun may be shifted vertically about the horizontal axes 28, 28, in such movement swinging up and down in the sector between members 11 and 12. The gun may also be shifted about the vertical axes 21, 22. At all times, the gunner is protected from air blasts, since the large dimensions of the transparent turret member or frame, which forms the greater part of a sphere, never uncover the edges of the opening in the wall 23, and no air can therefore enter therethrough or through the turret itself.

Figure 2:
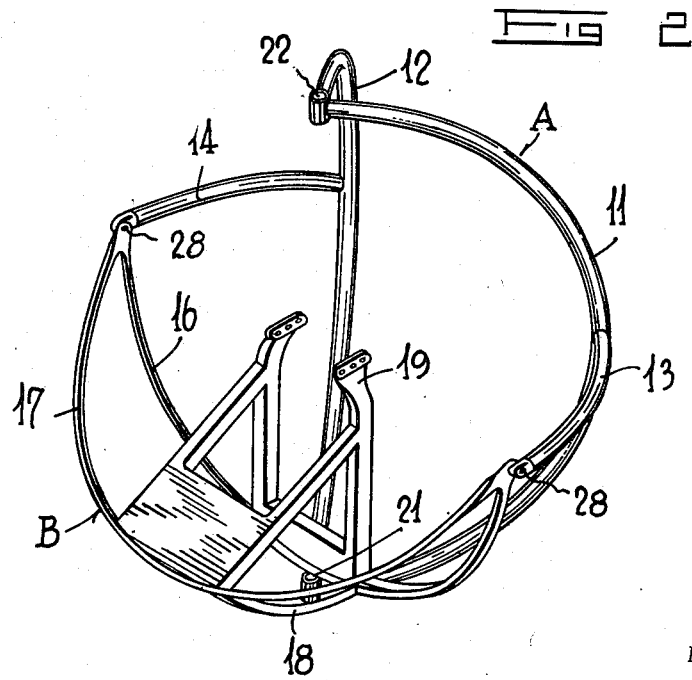
Fig. 2 is a perspective view of the mounting frame for the gun and turret.
Figure 3:
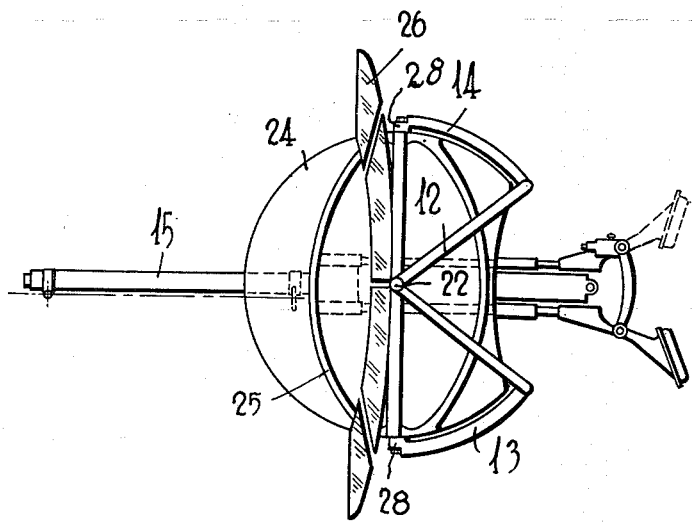
Fig. 3 is a top plan view of the invention in a modified form.
Figure 4:
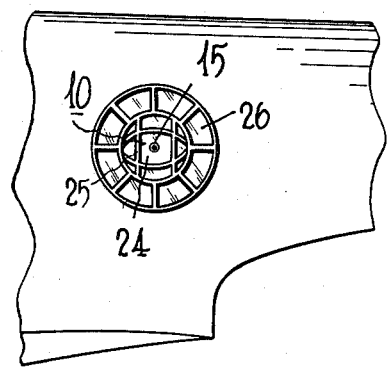
Fig. 4 is a front elevation of the gun turret of Fig. 3 showing it mounted in a portion of the hull of a flying boat.

In the form of the invention shown in Figs. 3 and 4, the gun is mounted in substantially the same fashion, and the turret is similar to that of Figs. 1 and 2. However, the turret is mounted in the center of a plurality of transparent sections 26 forming a part of the wall of the aircraft, and particularly of the hull of a flying boat. In this manner, the visibility of the device is increased. The sections 26 are mounted in the wall in any suitable manner.

The transparent members 26 are arranged in close fitting and fairing relation to one another. They thus streamline that portion of the turret which protrudes out into the air stream at the side of the aircraft.

While I have described herein some embodiments of my invention, I wish it to be understood that I do not intend to limit myself thereby except within the scope of the appended claim.

I claim:

In an aircraft, a wall having a fixed section of transparent material provided with an opening therein, pivots at said wall on opposite sides of said opening, a member mounted to turn about said pivots, a gun-carrying device pivoted on said member to turn about an axis coplanar with and substantially perpendicular to the axis of said first pivots, and a transparent turret member forming more than half a sphere rigid with said gun-carrying device, said turret member being adapted and arranged to prevent the passage of air therethrough when a gun is mounted therein.

MICHAEL WATTER.